United States Patent
Shintani

(10) Patent No.: US 10,594,938 B2
(45) Date of Patent: Mar. 17, 2020

(54) IMAGE PROCESSING APPARATUS, IMAGING APPARATUS, AND METHOD FOR CONTROLLING IMAGE PROCESSING APPARATUS

(71) Applicant: CANON KABUSHIKI KAISHA, Tokyo (JP)

(72) Inventor: Takuya Shintani, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 71 days.

(21) Appl. No.: 15/901,027

(22) Filed: Feb. 21, 2018

(65) Prior Publication Data
US 2018/0241946 A1 Aug. 23, 2018

(30) Foreign Application Priority Data
Feb. 22, 2017 (JP) .................. 2017-030878

(51) Int. Cl.
| | |
|---|---|
| *H04N 5/232* | (2006.01) |
| *G06T 7/207* | (2017.01) |
| *G06T 7/246* | (2017.01) |
| *H04N 5/235* | (2006.01) |

(52) U.S. Cl.
CPC ......... *H04N 5/23251* (2013.01); *G06T 7/207* (2017.01); *G06T 7/246* (2017.01); *H04N 5/2351* (2013.01); *H04N 5/2357* (2013.01); *H04N 5/23245* (2013.01); *H04N 5/23254* (2013.01); *H04N 5/23261* (2013.01); *H04N 5/23287* (2013.01); *G06T 2207/10016* (2013.01)

(58) Field of Classification Search
CPC ........... H04N 5/23251; H04N 5/23245; H04N 5/23254; H04N 5/23261; H04N 5/23287; H04N 5/2351; H04N 5/2357; H04N 5/232; H04N 5/243; H04N 5/23212; H04N 5/23222; H04N 5/23258; G06T 7/207; G06T 7/246; G06T 7/248; G06T 2207/10016
USPC ...................................... 348/208.1
See application file for complete search history.

(56) References Cited

U.S. PATENT DOCUMENTS

| | | | | |
|---|---|---|---|---|
| 10,205,885 | B2 * | 2/2019 | Miyazawa | ........... H04N 5/2353 |
| 10,348,966 | B2 * | 7/2019 | Washisu | ............. H04N 5/23212 |
| 2009/0102935 | A1 * | 4/2009 | Hung | ..................... H04N 5/235 348/222.1 |
| 2009/0128640 | A1 * | 5/2009 | Yumiki | .................... G03B 5/02 348/208.6 |

(Continued)

FOREIGN PATENT DOCUMENTS

| | | |
|---|---|---|
| JP | H08-88855 A | 4/1996 |
| JP | 2006-317848 A | 11/2006 |

*Primary Examiner* — Pritham D Prabhakher
(74) *Attorney, Agent, or Firm* — Carter, DeLuca & Farrell LLP

(57) ABSTRACT

An accelerated processing unit (APU) serving as an image processing apparatus includes an acquisition unit configured to acquire a first image captured through first imaging and a second image captured through second imaging performed subsequent to the first imaging; a first determination unit configured to determine an image used for calculating a motion vector from the first image and/or the second image in accordance with a result of photometry based on the first image; and a calculation unit configured to calculate the motion vector on the basis of the determined image.

14 Claims, 14 Drawing Sheets

(56) References Cited

U.S. PATENT DOCUMENTS

| | | | | |
|---|---|---|---|---|
| 2010/0194897 A1* | 8/2010 | Yumiki | ............ | G03B 7/091 |
| | | | | 348/208.4 |
| 2010/0328538 A1* | 12/2010 | Al-Kadi | ............ | H04N 5/145 |
| | | | | 348/699 |
| 2012/0237193 A1* | 9/2012 | Kawarada | ............ | G02B 7/34 |
| | | | | 396/95 |
| 2013/0293729 A1* | 11/2013 | Osawa | ............ | H04N 5/23248 |
| | | | | 348/208.12 |
| 2014/0321696 A1* | 10/2014 | Farid | ............ | G06T 7/0002 |
| | | | | 382/100 |
| 2016/0234424 A1* | 8/2016 | Ito | ............ | H04N 5/23212 |
| 2016/0323526 A1* | 11/2016 | Washisu | ............ | H04N 5/23212 |
| 2017/0104910 A1* | 4/2017 | Kimura | ............ | H04N 5/2352 |
| 2017/0214838 A1* | 7/2017 | Miyazawa | ............ | H04N 5/2353 |
| 2017/0272637 A1* | 9/2017 | Kawazoe | ............ | H04N 5/232 |

\* cited by examiner

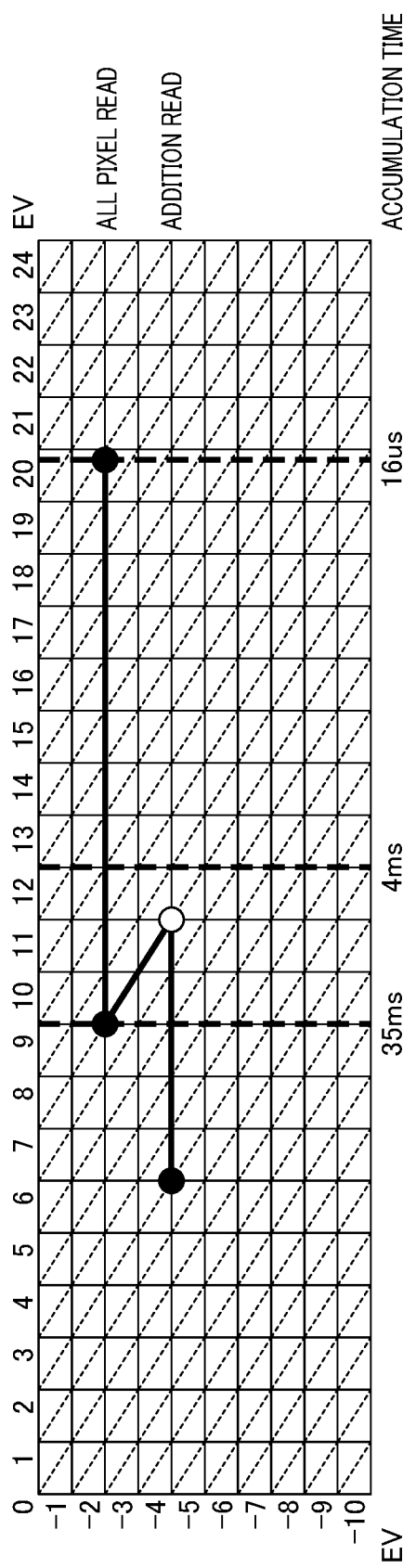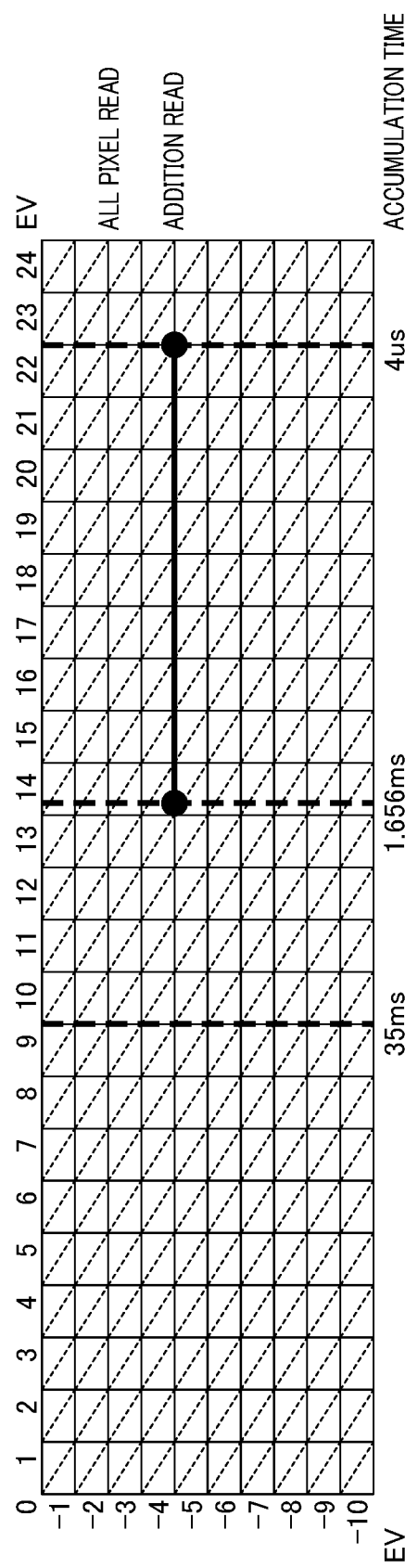

IMAGE PROCESSING APPARATUS, IMAGING APPARATUS, AND METHOD FOR CONTROLLING IMAGE PROCESSING APPARATUS

BACKGROUND OF THE INVENTION

Field of the Invention

The present invention relates to an image processing apparatus, an imaging apparatus, and a method for controlling an image processing apparatus.

Description of the Related Art

Panning is a photographing technique used to realize a speed feeling of a moving subject. In panning, a photographer pans a camera in accordance with the movement of a subject so that a moving subject is stopped and the background is caused to flow.

It is necessary for the photographer to perform panning in accordance with the movement of a subject in panning photographing, but an image has a blurred subject image in some cases when there is a difference between a moving speed of the subject and the panning speed. A technique for absorbing a difference between a moving speed of a subject and a panning speed due to the movement of a shift lens has been proposed as a technique for assisting a user performing panning photographing. Japanese Patent Laid-Open No. 2006-317848 discloses a configuration in which panning photographing is performed by detecting a subject from blur detection of a gyro sensor and a motion vector of an image, calculating an amount of correction for locating the detected subject at a center of the image, and performing correction is performed using the movement of an optical axis shift lens.

A technique for detecting a motion vector by comparing continuously photographed images has been proposed as a technique for detecting a motion vector from an image. Japanese Patent Laid-Open No. 8-88855 discloses a technique for comparing pixel values of reference blocks and candidate blocks to be subjected to block matching for detecting motion vectors while shifting a position of a candidate block within a search area. Furthermore, as a system for detecting a motion vector, there is a system for acquiring an image signal used for photometry using a photometric sensor of a penta part before photographing and processing the image signal.

However, in the technique disclosed in Japanese Patent Laid-Open No. 8-88855, since an amount of movement of a subject increases when a sampling interval of continuously photographed images increases, vector detection cannot be performed accurately unless a comparison area between a reference block and a candidate block in a continuous image is enlarged. On the other hand, when the comparison area is enlarged, a processing time for motion vector detection is prolonged resulting in a process in which a real time property is insufficient.

SUMMARY OF THE INVENTION

The present invention is to provide an image processing apparatus capable of accurately detecting a motion vector in accordance with a result of photometry using a sensor of a penta part.

The present invention includes: an acquisition unit configured to acquire a first image captured through first imaging and a second image captured through second imaging performed subsequent to the first imaging; a first determination unit configured to determine an image used for calculating a motion vector of the first image and/or the second image in accordance with a result of photometry based on the first image; and a calculation unit configured to calculate the motion vector on the basis of the determined image.

Further features of the present invention will become apparent from the following description of exemplary embodiments with reference to the attached drawings.

BRIEF DESCRIPTION OF THE DRAWINGS

FIGS. 4A and 4B are diagrams illustrating an example of a normal program diagram.

DESCRIPTION OF THE EMBODIMENTS (Embodiment 1)

Figure 1:
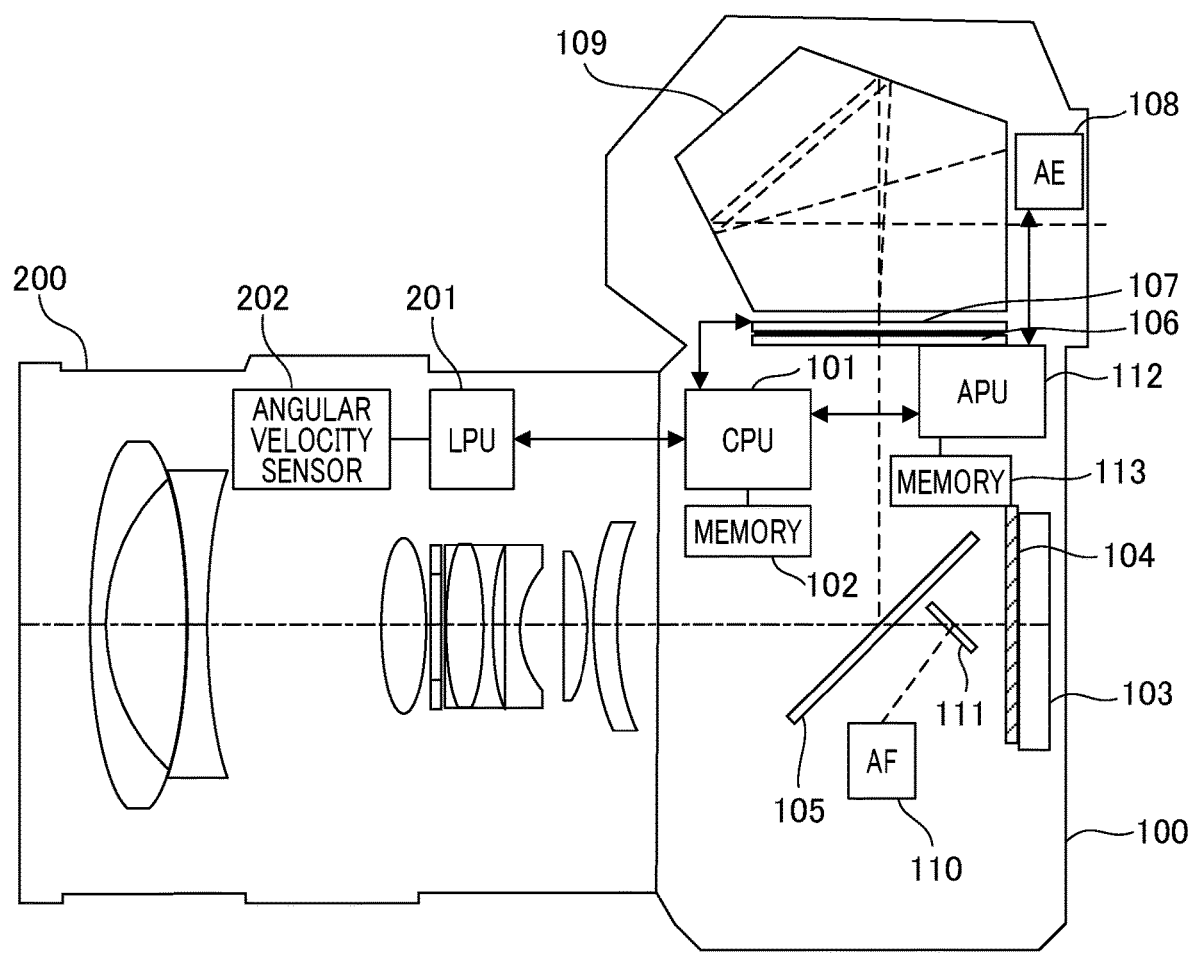
FIG. 1 is a diagram showing a configuration of the camera system.

FIG. 1 is a diagram showing a configuration of the camera system according to an embodiment. In FIG. 1, an imaging apparatus such as a digital camera including a camera main body 100 and a lens 200 will be described by way of example as the camera system. The lens 200 is an interchangeable lens which is attachable to and detachable from the camera main body 100. Note that the present invention can also be applied to an imaging apparatus in which a lens and a camera main body are integrally formed.

First, the configuration of the camera main body 100 will be described. The camera main body 100 includes a central processing unit (CPU) 101, a memory 102, an imaging element 103, a shutter 104, a half mirror 105, a focusing plate 106, a display element 107, a photometric sensor 108, and a pentaprism 109. In addition, the camera main body 100 includes a focus detection circuit 110, an auto focus (AF) mirror 111, an accelerated processing unit (APU) 112, and a memory 113.

The CPU 101 is a microprocessor configured to control units in the camera main body 100. The memory 102 is a memory such as a random access memory (RAM) or a read only memory (ROM) connected to the CPU 101. The imaging element 103 is an imaging element such as a charge coupled device (CCD) and a complementary metal-oxide semiconductor (CMOS) including an infrared cut filter, a low pass filter, or the like, and an image of a subject is formed by the lens 200 at the time of photographing. The shutter 104 shields the imaging element 103 at the time of non-photographing and is opened at the time of photographing and guides light rays to the imaging element 103. The half mirror 105 reflects a part of light incident through the lens 200 at the time of non-photographing and forms an image of the light on the focusing plate 106.

The display element 107 is a display element configured to display an AF distance measurement frame such as a PN liquid crystal and indicates a position in which the digital camera is automatically brought into focus to a user when the user looks in an optical viewfinder.

Figure 2:
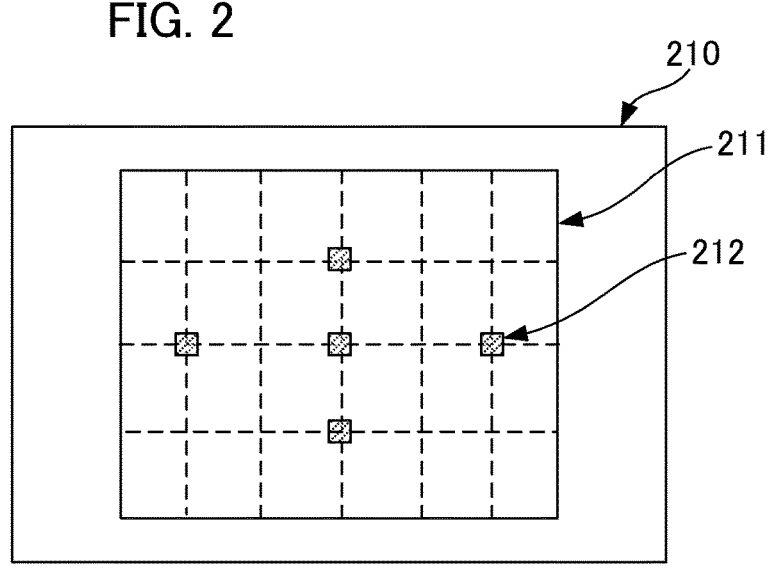
FIG. 2 is a diagram illustrating an example of a distance measurement frame arrangement in a distance measurement frame display element.

Here, FIG. 2 illustrates an example of a distance measurement frame arrangement in the display element 107. A frame indicated by an outer solid line represents an imaged area 210 and a frame indicated by an inner solid line represents a photometric area 211. A diagonal quadrangle indicates a distance measurement frame 212. In the embodiment, an example in which a PN liquid crystal is used as the display element 107 of the distance measurement frame will be described. In the PN liquid crystal, a liquid crystal of a distance measurement frame selected through an instruction from the CPU 101 is diffused and the distance measurement frame 212 is displayed. Furthermore, the photometric area 211 and a correspondence between the photometric area and a distance measurement frame in which the photometric area is divided into a predetermined number of block areas are indicated by dotted lines.

FIG. 1 will be described again. The photometric sensor 108 performs not only photometry but also motion vector detection serving as the feature of the present proposal which will be described below using an imaging element such as a CCD and a COMS. Light of a subject image of the focusing plate 106 is guided to the photometric sensor 108 and the optical viewfinder through the pentaprism 109. The photometric sensor 108 obtains light of the subject image formed on the focusing plate 106 through the pentaprism from an oblique position.

The focus detection circuit 110 performs distance measurement for automatic focusing on the subject on the basis of a light flux received by an AF sensor in the focus detection circuit 110. A part of the light flux incident through the lens 200 and passing through the half mirror 105 is guided to the AF sensor in the focus detection circuit 110 through the AF mirror 111.

The APU 112 is a CPU for image processing and calculation of the photometric sensor 108 and performs face detection calculation, tracking calculation, photometric calculation, motion vector detection calculation, or the like. The memory 113 is a memory such as a RAM or a ROM connected to the APU 112. Note that, although a dedicated CPU for a photometric sensor like the APU 112 is prepared in the embodiment, processing may be performed by the CPU 101 or the like. Furthermore, the APU 112 or the CPU 101 may be configured as image processing devices.

A configuration of the lens 200 will be described below. The lens 200 includes a light processing unit (LPU) 201, an angular velocity sensor 202, and a photographing lens unit.

The LPU 201 is a CPU (hereinafter referred to as an "LPU") in a lens and a microprocessor configured to control units in the lens 200. Furthermore, the LPU 201 sends distance information to the subject, angular velocity information which will be described below, or the like to the CPU 101 of the camera main body 100. The angular velocity sensor 202 is an angular velocity sensor such as a gyro sensor, detects an angular velocity representing an amount of movement of the lens 200, converts the angular velocity information into an electrical signal, and outputs the electrical signal to the LPU 201. The lens 200 corrects image blur of the subject by driving a shift lens using the LPU 201 and the angular velocity sensor 202. The photographing lens unit includes a main imaging optical system, a zoom lens group capable of changing a focal length, and the shift lens configured to perform optical correction of image blur using movement in a direction which is perpendicular to an optical axis.

A photometric method according to a state of the camera will be described below with reference to FIG. 3. In the camera main body 100, photometry is performed by pressing (half-pressing) a photographing button (not shown). Note that it is assumed that photometry is performed when the photographing button is in an Sw1 state (a half pressed state) and imaging is performed when the photographing button is in an Sw2 state (a fully pressed state), in which the button is further pressed from the Sw1 state. Photometry is performed by photographing and acquiring an image using the photometric sensor 108 and performing calculation processing in the APU 112 on the basis of the acquired image. In the embodiment, it is possible to perform three types of photometric processing, i.e., a normal mode, a panning assist resolution priority mode, and a panning assist sampling rate priority mode.

Figure 3:
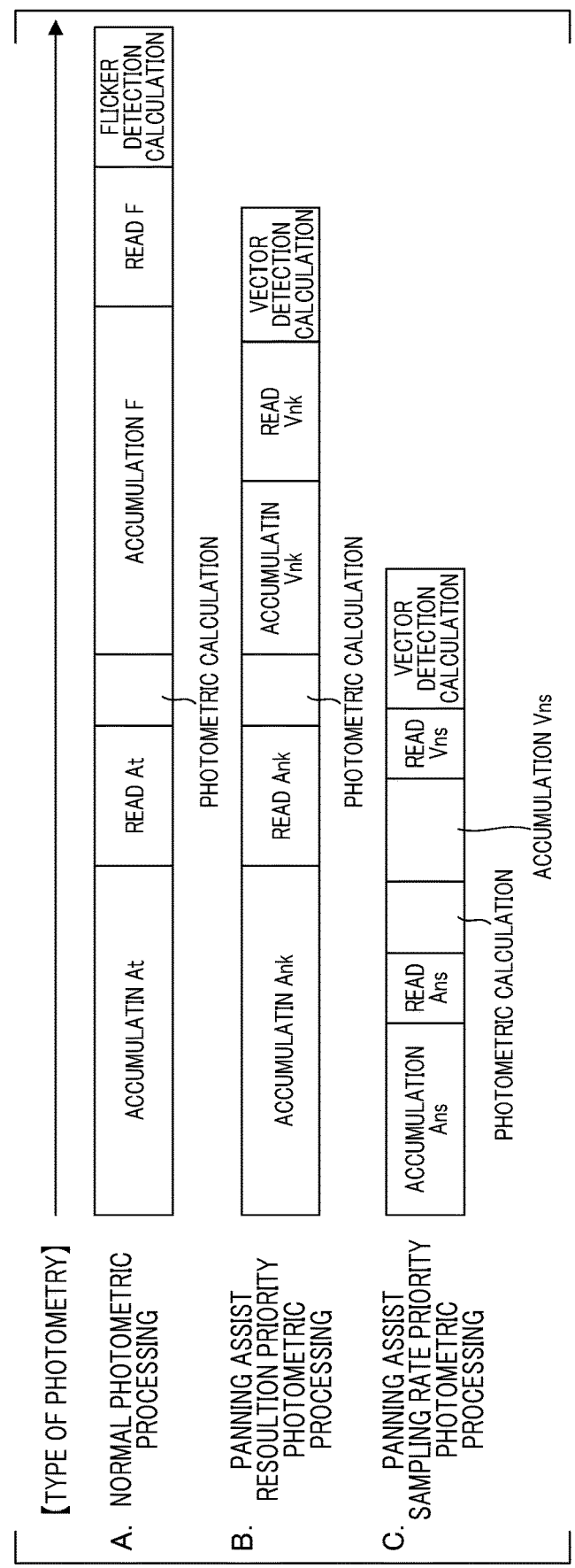
FIG. 3 is a diagram for describing a photometry processing sequence.

A of FIG. 3 is a diagram showing a sequence during photometric processing in the normal mode. In the photometric processing in the normal mode, first, a photometric image (hereinafter referred to as a "photometric image T") obtained using an accumulation At and a read At is captured. Moreover, it is assumed that brightness in a photometric area range is measured by performing photometric calculation on the basis of the photometric image T. An algorithm for photometric calculation processing is obtained, for example, using a method for measuring the overall brightness by dividing the photometric area illustrated in FIG. 2 for each predetermined number of block areas and measuring the brightness for each block. Note that, since the algorithm for the photometric calculation processing is not directly related to the feature of the present invention, detailed description thereof will be omitted.

In the photometric processing in the normal mode, subsequent to the photometric calculation for measuring the brightness, acquisition of an image for determining a blinking cycle of a so-called flicker such as a fluorescent lamp or the like which intensively repeatedly blinks using an alternating current (AC) and flicker detection calculation are performed. To be specific, an accumulation F and a read F for determining a blinking cycle for the flicker is performed and flicker detection calculation used to acquire flicker information from the obtained image (hereinafter referred to as a "flicker image F") is performed. Since the accumulation F, the read F, and the flicker detection calculation are not related to the feature of the present invention, description thereof will be omitted, but a flicker blinking cycle or the like can be measured by continuously photographing a plurality of flicker images F with a short accumulation time.

B of FIG. 3 is a diagram showing a sequence during photometric processing in a panning assist resolution priority mode. Panning assistance is a function of supporting panning by the user. A control mode when the setting of the panning assistance has been performed is referred to as a "panning assist mode." Moreover, a mode in which resolution of an image is prioritized when the image used for a motion vector detection is acquired in the panning assist mode is referred to as a "panning assist resolution priority mode." The resolution of the image is prioritized and an image with high resolution is used so that a fine motion vector can also be detected.

In the photometric processing in the panning assist resolution priority mode, first, like in the photometric processing in the above-described normal mode, the brightness in a photometric area range is measured by capturing a photometric image (hereinafter referred to as a "photometric image K") and performing photometric calculation on the basis of the photometric image T. The photometric image K is obtained using an accumulation Ank and a read Ank. For the accumulation Ank and the read Ank in the panning assist resolution priority mode, the same processing as the photometric processing in the normal mode is performed and a program diagram thereof is also the same as in the normal mode. The program diagram will be described below with reference to FIGS. 4A to 6B.

In the panning assist resolution priority mode and the normal mode, the processes performed for motion vector detection performed after the photometry are different. In the panning assist resolution priority mode, an accumulation Vnk and a read Vnk for capturing an image for motion vector detection are performed and motion vector detection calculation is performed from the obtained image (hereinafter referred to as a "vector image K"). The vector image K captured in the panning assist resolution priority mode is an image with high resolution. Note that the accumulation Vnk and the read Vnk in the panning assist resolution priority mode perform an operation of all pixel read driving in accordance with a program diagram of FIG. 5B which will be described below. Thus, since the motion vector detection calculation can be performed using the vector image K with high resolution in the motion vector detection calculation, a motion vector of a small subject or a fine part in the subject can be detected. Note that, although block pattern matching for comparing continuously photographed images is used for the motion vector detection calculation according to the embodiment, since the details of the block pattern matching are well-known techniques, description thereof will be omitted.

C of FIG. 3 is a diagram showing a sequence during photometric processing in the panning assist sampling rate priority mode. A mode in which a sampling rate is prioritized when an image used for motion vector detection is acquired in the panning assist mode is referred to as a "panning assist sampling rate priority mode." Detection accuracy of a motion vector of something with a fast moving speed or something with large a motion (blur) increases when a sampling rate is prioritized and an image is acquired at a high sampling rate.

In the photometric processing in the panning assist sampling rate priority mode, first, like in the above-described normal photometric processing, brightness in a photometric area range is measured by capturing a photometric image (hereinafter referred to as a "photometric image S") and performing photometric calculation on the basis of the photometric image S. The photometric image S is obtained using an accumulation Ans and a read Ans. Although the photometric processing performed in the panning assist sampling rate priority mode is the same processing as the photometric processing in the normal mode, the program diagram used in the panning assist sampling rate priority mode is different from the program diagram used in the normal mode. Details of the program diagram will be described below with reference to FIGS. 4A to 6B.

In the panning assist sampling rate priority mode and the normal mode, the processes performed for the motion vector detection performed after the photometry are different. In the panning assist sampling rate priority mode, an accumulation Vns and a read Vns for capturing an image for motion vector detection are performed and a motion vector detection calculation is performed from the obtained image (hereinafter referred to as a "vector image S"). Note that the accumulation Vns and the read Vns at the time of the motion vector detection in the panning assist sampling rate priority mode perform read driving of either an all pixel read driving method or an addition read driving method depending on the brightness. The accumulation Ans, the read Ans, the accumulation Vns, and the read Vns at the same brightness can be shorter than those of the panning assist resolution priority mode even when motion vector calculation is to be performed using a vector image S with low resolution to correspond to an addition image using the addition read driving method. For this reason, blurring disappears and a sampling rate can be increased. Details of the all pixel read driving method and the addition read driving method will be described below with reference to FIGS. 7A to 7C.

A program diagram related to an Ev value, an accumulation time, and a read driving method will be described below with reference to FIGS. 4A to 6B. FIGS. 4A to 6B illustrate an example of a program diagram used in the embodiment and are program diagrams showing a relationship among an Ev value (subject luminance), an accumulation time, and the read driving method. An upper horizontal axis and a left vertical axis represent an Ev value, a lower horizontal axis represents an accumulation time, and a right vertical axis represents the read driving method.

FIG. 4A is an example of a program diagram of an accumulation time of the accumulation At and the read driving method of the read At which acquires a photometric image T for photometry in the normal mode described with reference to A of FIG. 3. In the normal mode in the embodiment, brightness can also be accurately measured at the time of low luminance. For this reason, in the program diagram for the photometric processing in the normal mode, in the case of low luminance of a certain extent, the limit of noise and sensitivity at the time of low luminance is improved in a photometric sensor by switching the read driving method from "all pixel reading" to "addition reading." The addition reading is the read driving method in which neighboring pixels are added and read. For example, in FIG. 4A, the accuracy limit of the photometry at the time of low luminance from Ev 8 to Ev 2 is improved by setting the read At from the all pixel read driving method to the addition read driving method using the vicinity of Ev 8 and an accumulation time 35 ms of the accumulation At as a boundary. The all pixel read driving method and the addition read driving method will be described in detail below with reference to FIGS. 7A to 7C. Furthermore, in the photometric processing in the normal mode, for example, a photometric image with high resolution can be acquired by setting the photometric image to the all pixel read driving method up to 35 ms. Accuracy of image recognition (subject recognition) which does not require, for example, continuity of images such as a face detection result is improved by acquiring a photometric image with high resolution.

FIG. 4B is an example of the program diagram of the accumulation time of the accumulation F and the read driving method of the read F in which the flicker image F for detecting the flicker is acquired in the normal mode described with reference to A of FIG. 3. In the program diagram for detecting the flicker according to the embodiment, in order to detect the flicker, the program diagram is set such that the accumulation F and the read F are completed in a time shorter than the blinking cycle of the flicker so that a plurality of images are captured in time series within the blinking cycle. For example, accumulation times of accumulations F in which a plurality of images are captured are set within 1.656 ms which is shorter than the blinking cycle of the flicker and the read F is set to the addition read driving method.

Figure 5A:
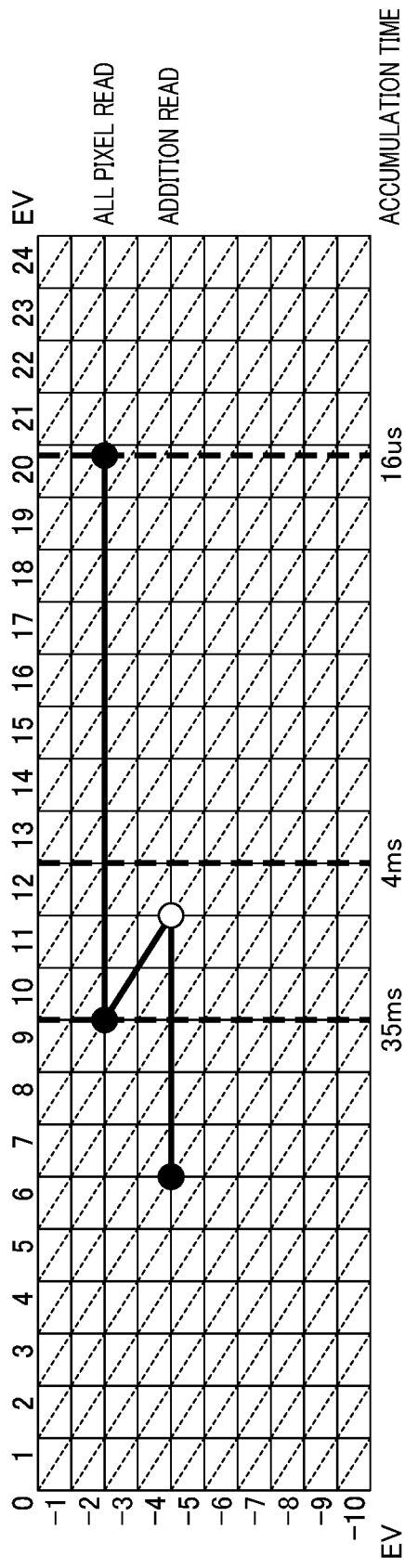
FIGS. 5A and 5B are diagrams illustrating an example of a resolution priority program diagram.

FIG. 5A is an example of the program diagram of the accumulation time of accumulation Ank and the read driving method of the read Ank which acquire the photometric image K in the panning assist resolution priority mode described with reference to B of FIG. 3. In the embodiment, the program diagram is the same as the program diagram at the time of photometry in the normal mode illustrated in FIG. 4A.

Figure 5B:
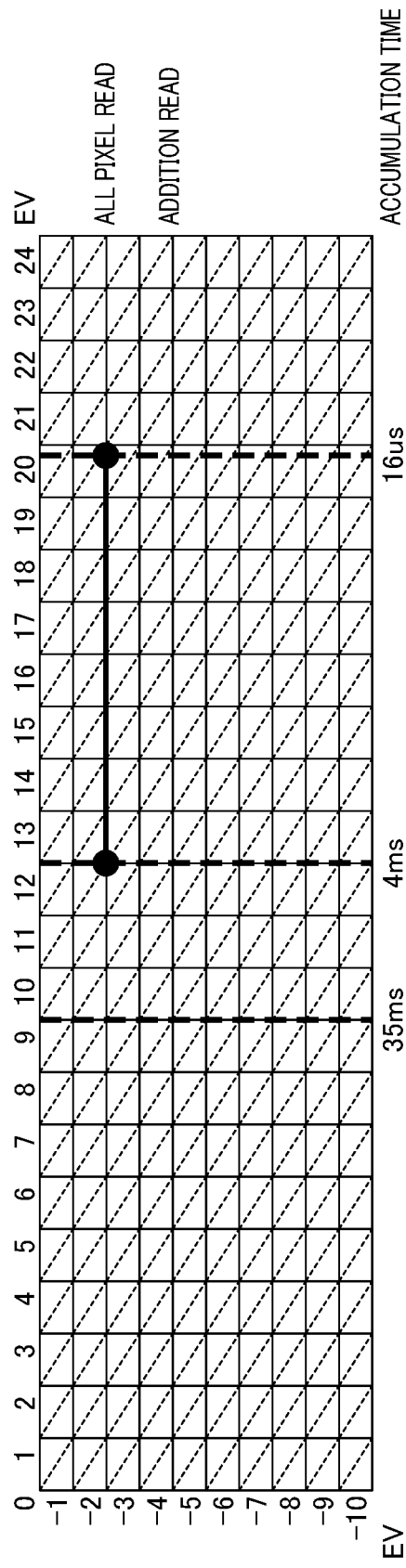

FIG. 5B is an example of the program diagram of the accumulation time of the accumulation Vnk and the read driving method of the read Vnk which acquire the vector image K in the panning assist resolution priority mode described with reference to B of FIG. 3. FIG. 5B is a program diagram when resolution at the time of motion vector detection is regarded as important. The accumulation Vnk for motion vector detection according to the embodiment is performed during panning, that is, during panning of the camera. For this reason, the accumulation time of the accumulation Vnk is set to be shorter than a predetermined time, for example, within 4 ms, so that image blur of the subject does not occur in the vector image K.

In addition, in order to detect the subject using an image with high resolution, in the read driving method using the read Vnk, imaging is performed at all times using the all pixel read driving method. Note that, since an accumulation time is not lengthened even at the time of low luminance in this diagram, an image to be captured is darker than that at the time of appropriate exposure when an EV value is equal to or less than Ev 10, but the absence of blur leads to an improvement in accuracy of the block pattern matching used at the time of the motion vector detection calculation. For this reason, a restriction of the accumulation time is provided.

Figure 6A:
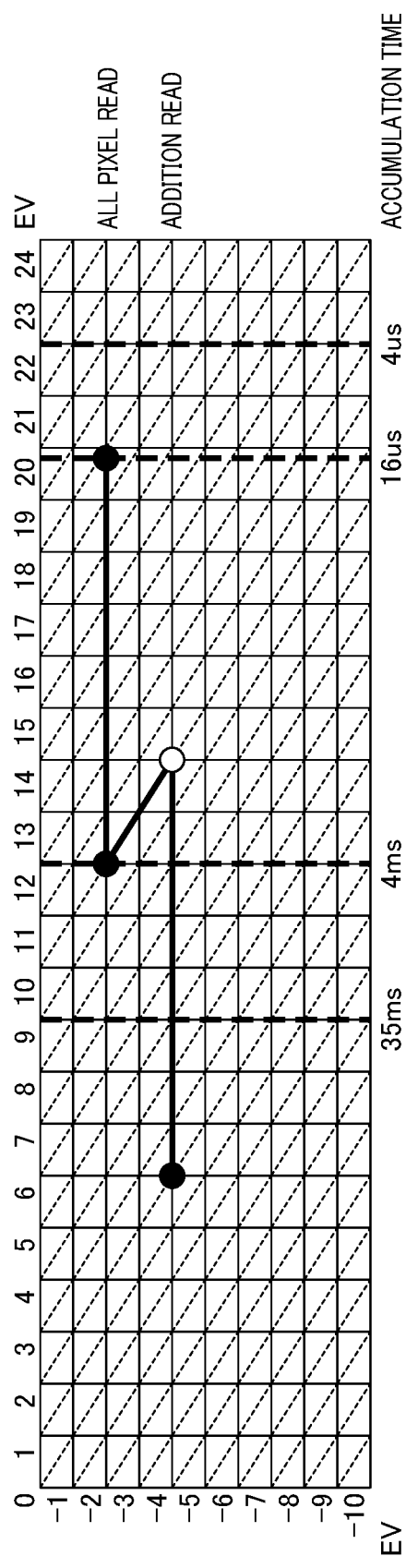
FIGS. 6A and 6B are diagrams illustrating an example of a sampling rate priority program diagram.

FIG. 6A is an example of the program diagram of the accumulation time of the accumulation Ans and the read driving method of the read Ans in which the photometric image S is acquired in the panning assist sampling rate priority mode described with reference to C of FIG. 3. The accumulation Ans at the time of the photometric processing in the panning assist sampling rate priority mode is performed during panning, that is, during panning of the camera. For this reason, control is performed such that the accumulation time falls within 4 ms, for example, up to Ev 8 so that the blur of the subject does not occur in the photometric image S either. In addition, when low luminance of a certain extent is obtained, switching is performed from the all pixel read driving method to the addition read driving method. For example, at the time of Ev 10 at which the accumulation time of the accumulation Ans exceeds 4 ms, switching is performed from an all pixel read driving method to the addition read driving method.

Figure 6B:
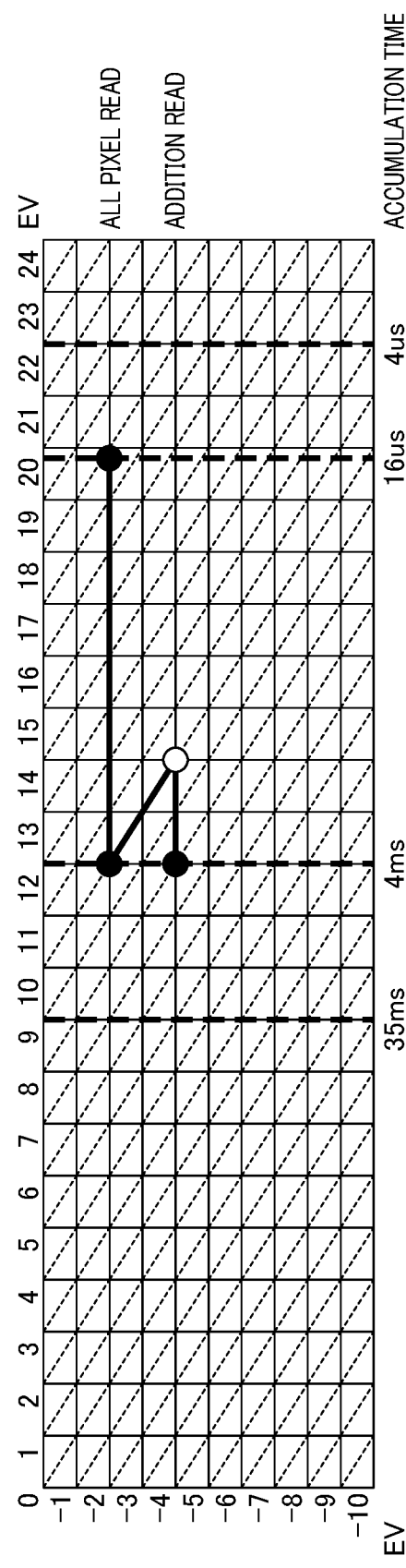

FIG. 6B is an example of the program diagram of the accumulation time of the accumulation Vns and the read driving method of the read Vns in which the vector image S is acquired in the panning assist sampling rate priority mode described with reference to C of FIG. 3. The accumulation Vns for motion vector detection according to the embodiment is performed during panning, that is, during panning of the camera. For this reason, the accumulation time of the accumulation Vns is set to be shorter than a predetermined time, for example, within 4 ms like in FIG. 5B so that image blur of the subject does not occur in the vector image S.

Also, since a sampling rate is regarded as more important than resolution in the panning assist sampling rate priority mode, unlike FIG. 5B in which resolution is regarded as important, in the case of low luminance of a certain extent, switching is performed from the all pixel read driving method to the addition read driving method. For example, at the time of Ev 10 at which an accumulation time of the accumulation Vns is 4 ms, switching is performed from the all pixel read driving method to the addition read driving method. The addition read driving method is adopted so that a read time is shortened as compared with that described with reference to FIG. 5B and a plurality of vector images S can be captured without lowering the sampling rate even for a dark subject.

Note that an EV value or a numerical value of an accumulation time used in the description of FIGS. 4A to 6B is merely an example, and the present invention is not limited thereto.

Figure 7A:
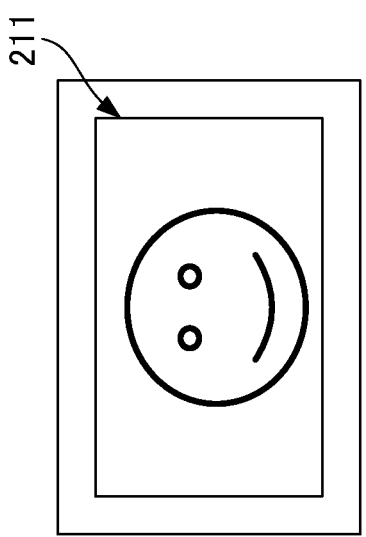
FIGS. 7A to 7C are diagrams showing an all pixel read image and an addition read image.
Figure 7B:
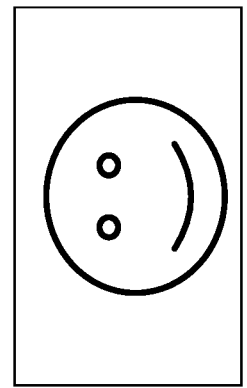
Figure 7C:
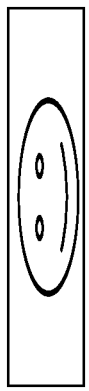

The all pixel read driving method (all pixel reading) and the addition read driving method (addition reading) will be described below with reference to FIGS. 7A to 7C. FIG. 7A is a diagram showing the photometric area 211 and the subject described with reference to FIG. 2. FIG. 7B is an image of a photometric image, a flicker image, and a vector image at the time of all pixel reading. On the other hand, FIG. 7C is an image of a photometric image, a flicker image, and a vector image at the time of addition reading. In the all pixel reading, since a photographed image in a photometric area of the sensor is output as it is, an image with high capturing resolution can be captured. On the other hand, in the addition reading, since pixels are added and read, a compressed image with low resolution can be captured from a captured image. In the addition reading, pixel signals are added and read so that the number of read lines is reduced in a pseudo manner and thus a read time can be shortened as compared with the all pixel reading.

A system for performing panning assistance while performing photometry using a sensor of a penta part according to the embodiment will be described.

Figure 8:
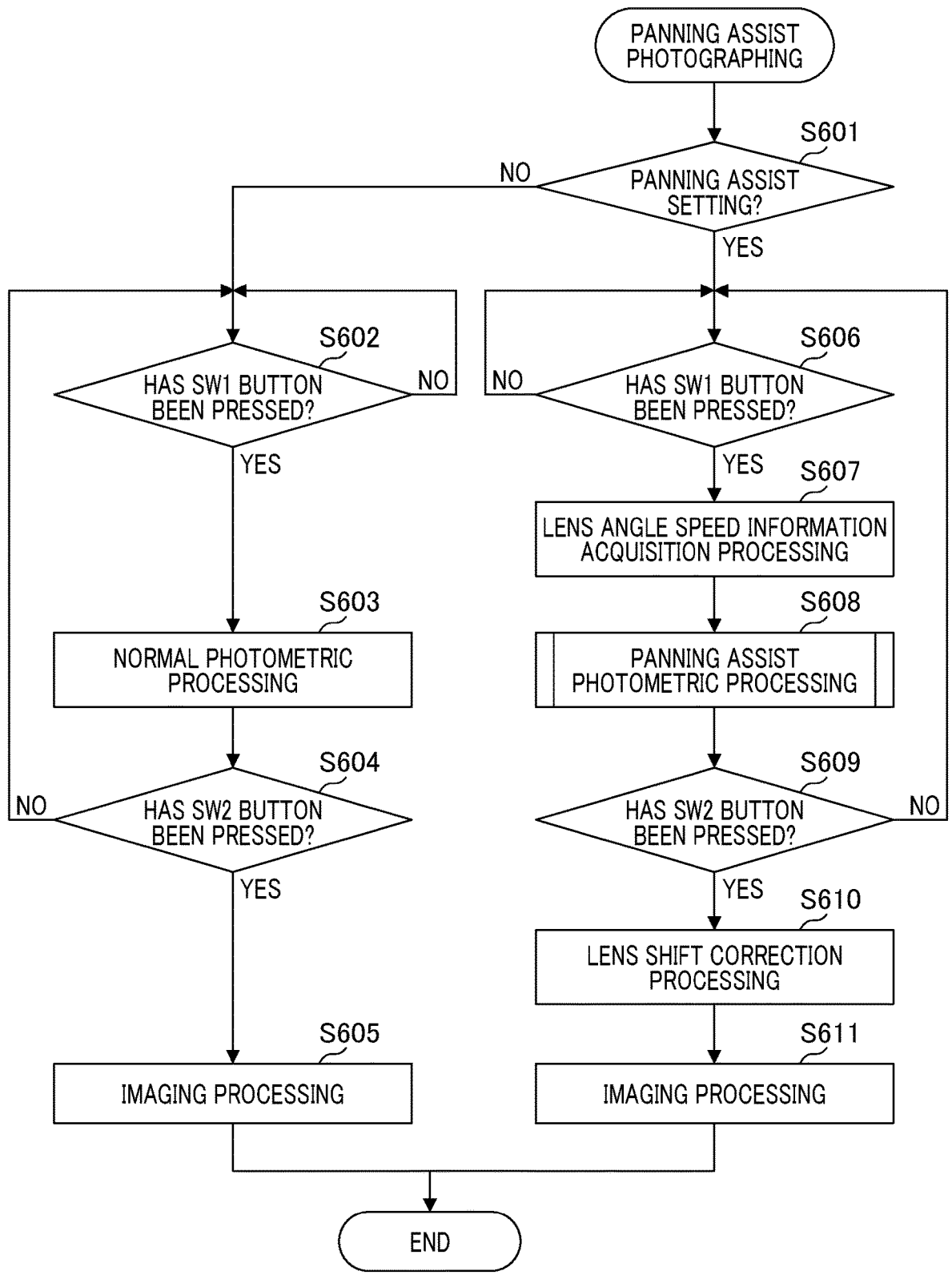
FIG. 8 is a flowchart for describing panning assist photography.

FIG. 8 is a flowchart for panning assist photography processing according to the embodiment.

First, in Step S601, the CPU 101 determines whether the panning assist setting is performed. In the embodiment, the panning assist setting is set by the user using a photographing setting menu screen and an operation button (not shown) in FIG. 1 and stored in the memory 102 or the memory 113. The process proceeds to a process of Step S602 when it is determined that the panning assist setting is not performed. On the other hand, the process proceeds to a process of Step S606 when it is determined that the panning assist setting is performed.

Also, in the embodiment, two types of setting modes are prepared as the panning assist setting. A first mode is a panning assist resolution priority mode in which resolution is prioritized. This mode is set when motion vector detection is performed in an operation requiring further resolution, for example, when the subject is small or when panning assistance is performed while finely recognizing the subject. A second mode is a panning assist sampling rate priority mode in which a sampling rate is prioritized. This mode is set in an operation requiring a higher sampling rate, for example, when panning assistance is performed while recognizing a large subject which moves fast. In the embodiment, when setting the panning assistance, the user also sets whether priority is given to resolution or a sampling rate. Note that the user may directly set whether priority is given to any of resolution or a sampling rate or the user may set whether priority is given to any of resolution or a sampling rate by inputting a size or a speed level of the subject on an operation screen.

In Step S602, the CPU 101 determines whether the photographing button is in the Sw1 state (the half-pressed state). When it is determined that the photographing button is not in the Sw1 state, the process of Step S602 is repeated, and when it is determined that the photographing button is in the Sw1 state, the process proceeds to a process of Step S603.

In Step S603, the APU 112 performs the photometric processing in the normal mode described with reference to A of FIG. 3.

In Step S604, the CPU 101 determines whether the photographing button is in the Sw2 state (the fully pressed state). When it is determined that the photographing button is not in the Sw2 state, the process transitions to the process of Step S602. On the other hand, when it is determined that the photographing button is in the Sw2 state, the process proceeds to a process of Step S605.

In Step S605, light rays are guided to the imaging element 103, imaging processing is performed, and the process ends. Note that, since the detailed flow of the imaging processing is well known, description thereof will be omitted.

On the other hand, in Step S601, when it is determined that the panning assist setting is performed, the process proceeds to the process of Step S606. In Step S606, the CPU 101 or the APU 112 determines whether the photographing button is in the Sw1 state. When it is determined that the photographing button is not in the Sw1 state, the process of Step S606 is repeated, and when it is determined that the photographing button is in the Sw1 state, the process proceeds to a process of Step S607.

In Step S607, the CPU 101 performs lens angular velocity information acquisition processing. In the lens angular velocity information acquisition processing, the CPU 101 acquires lens angular velocity information from the angular velocity sensor 202 via the LPU 201. Thus, an angular velocity in which panning is performed in accordance with the movement of the subject when the camera performs panning photographing can be obtained.

Subsequently, in Step S608, the panning assist photometric processing is performed. A detailed flow of the panning assist photometric processing will be described below with reference to FIGS. 9 to 12.

Subsequently, in Step S609, the CPU 101 determines whether the photographing button is in the Sw2 state. When it is determined that the photographing button is not in the Sw2 state, the process transitions to the process of Step S606. On the other hand, when it is determined that the photographing button is in the Sw2 state, the process proceeds to a process of Step S610.

In Step S610, an angular velocity of the subject is calculated and lens shift correction processing for correcting image blur of the subject is performed. To be specific, the CPU 101 calculates an angular velocity of the subject from a panning speed of the camera acquired through the lens angular velocity information acquisition processing in Step S607 and the result of the motion vector detection calculation acquired through the panning assist photometric processing in Step S608. Moreover, image blur corresponding to the deviation of the angular velocity of the subject and the panning speed of the camera is corrected by driving the shift lens.

In Step S611, light rays are guided to the imaging element 103, imaging processing is performed, and the process ends.

Figure 9:
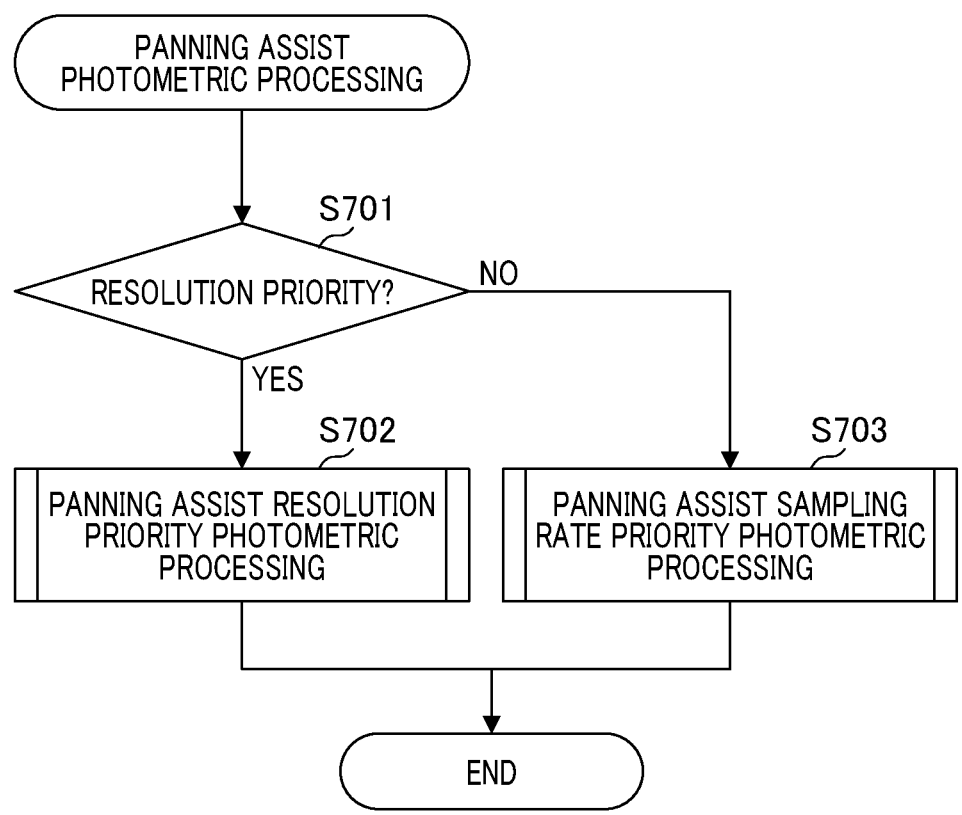
FIG. 9 is a flowchart for describing panning assist photometry.

FIG. 9 is a flowchart for describing the panning assist photometric processing described with reference to Step S608 of FIG. 8.

First, in Step S701, the CPU 101 determines whether the panning assistance is set in a resolution priority mode. If it is determined that the panning assist setting is a resolution priority, the process proceeds to a process of Step S702. In Step S702, photometric processing in the panning assist resolution priority mode is performed. A detailed flow of the photometric processing in the panning assist resolution priority mode will be described below with reference to FIG. 10. On the other hand, in Step S701, when it is determined that the panning assist setting is not a resolution priority, the process proceeds to a process of Step S703. In Step S703, photometric processing in the panning assist sampling rate priority mode is performed. A detailed flow of the photometric processing in the panning assist sampling rate priority mode will be described below with reference to FIGS. 11 and 12.

Figure 10:
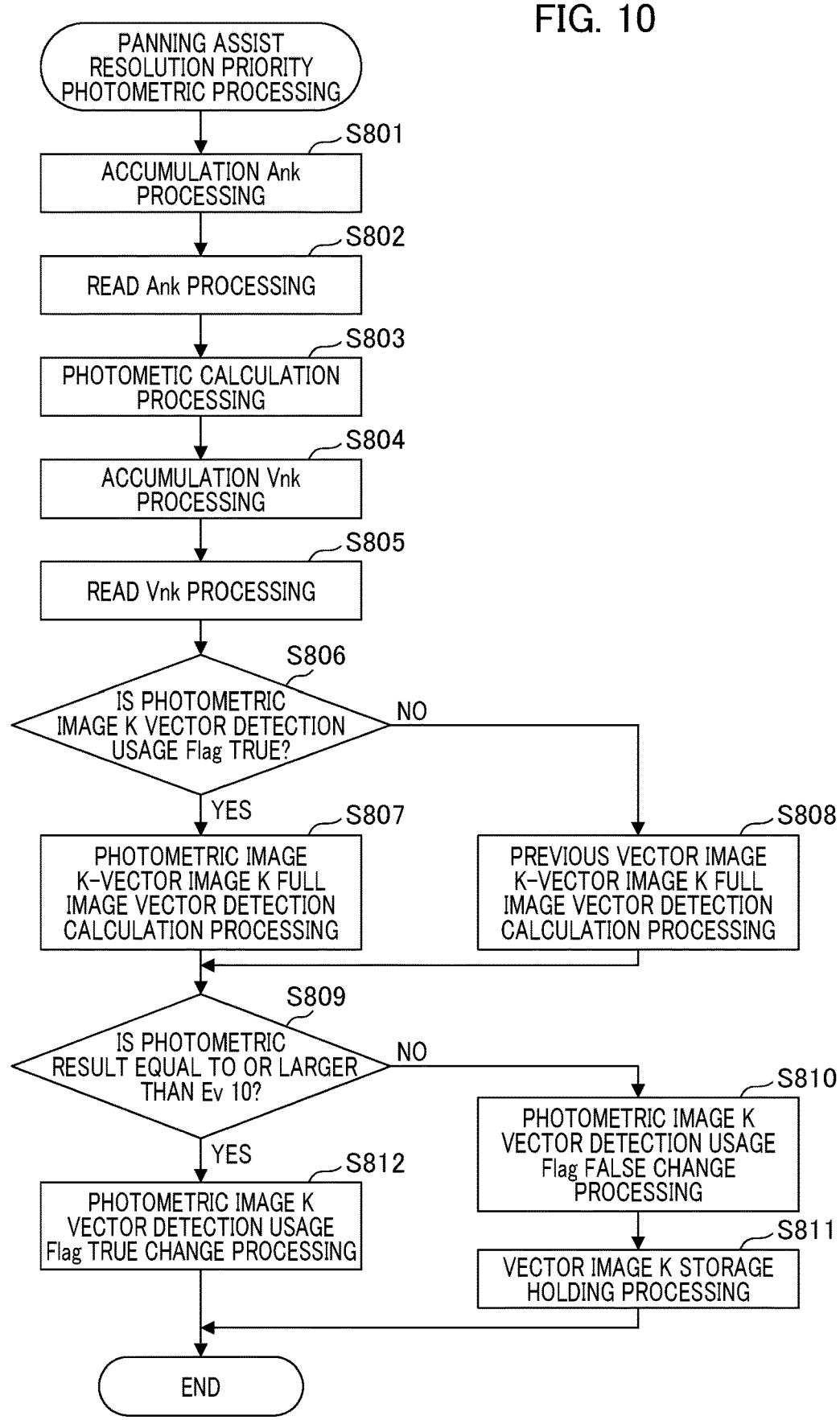
FIG. 10 is a flowchart for describing resolution priority photometry processing.

FIG. 10 is a flowchart for describing the photometric processing in the panning assist resolution priority mode described with reference to Step S702 of FIG. 9. In the flowchart, the processes described with reference to B of FIG. 3 are sequentially performed.

First, in Step S801 and Step S802, a photometric image is captured, and in Step S803, the brightness of the image is calculated.

In Step S801, accumulation Ank processing is performed using the photometric sensor 108. The accumulation Ank processing is performed on the photometric sensor 108 under the control of the APU 112. Note that an accumulation time at this time follows the program diagram described with reference to FIG. 5A. Furthermore, since a first accumulation time for the first time is not determined because there is no photometric value, it is assumed that the first accumulation time starts as 4 ms in which Ev 10 is assumed in the embodiment.

In Step S802, read Ank processing is performed. In the read Ank processing, the APU 112 reads a signal corresponding to an electrical charge accumulated in Step S801 from the photometric sensor 108 and acquires a photometric image K. The photometric image K is recorded in the memory 113. Note that, since the read Ank processing follows the program diagram described with reference to FIG. 5A, in the case of Ev 8 or more, reading is performed using the all pixel driving method, and in the case of less than Ev 8, reading is performed using the addition read driving method.

In Step S803, the APU 112 performs the photometric calculation processing on the basis of the photometric image K. Since an algorithm of the photometric calculation processing is not directly related to the features of the present invention, description thereof will be omitted.

Subsequently, in Step S804 and Step S805, an image for motion vector detection is captured.

In Step S804, the accumulation Vnk processing is performed using the photometric sensor 108. The accumulation Vnk processing is performed on the photometric sensor 108 under the control of the APU 112. Note that the accumulation time at this time follows the program diagram described with reference to FIG. 5B. Furthermore, since a first accumulation time for the first time is not determined because there is no photometric value, it is assumed that the first accumulation time starts as 4 ms in which Ev 10 is assumed in the embodiment.

In Step S805, the read Vnk processing is performed. In the read Vnk processing, the APU 112 reads a signal corresponding to a charge accumulated in Step S804 from the photometric sensor 108 and acquires a vector image K. The vector image K is recorded in the memory 113. Note that, since the vector image K follows the program diagram described with reference to FIG. 5B, the vector image K is read using the all pixel driving method at all times.

Subsequently, in Steps S806 to S808, vector detection calculation processing is performed.

First, in Step S806, a flag used to determine whether the photometric image K captured in Step S802 is used as an image for motion vector detection calculation is determined. This flag is stored in the memory 113 and determination is performed under the control of the APU 112. Note that, in the first time, it is assumed that TRUE is set as an initial value. When it is determined that the photometric image K is used, that is, when it is determined that the flag is TRUE, the process proceeds to a process of Step S807. On the other hand, when it is determined that the photometric image K is not used, that is, when it is determined that the flag is FALSE, the process proceeds to a process of Step S808.

In Step S807, the APU 112 performs full image motion vector detection calculation using block pattern matching for comparing images read using all pixel driving from the photometric image K and the vector image K.

On the other hand, in Step S808, the APU 112 performs motion vector detection calculation without using the photometric image K. To be specific, full image motion vector detection calculation is performed using the block pattern matching for comparing images read using the all pixel driving method from a vector image K stored as the previous vector image and a vector image K captured in the current Step S805.

Subsequently, in Step S809, the APU 112 determines whether the result of the photometric calculation in Step S803 is brighter than that of a predetermined exposure, that is, whether the result is equal to or more than that of the predetermined exposure. In the embodiment, for example, it is determined whether an Ev value is equal to or more than Ev 10. When it is determined that the result is equal to or more than that of the predetermined exposure, that is, when it is determined that Ev is 10 or more, the process proceeds to a process of Step S812. On the other hand, when it is determined that the result is less than that of the predetermined exposure, that is, when it is determined that Ev is not 10 or more, the process proceeds to a process of Step S810.

In Step S812, the APU 112 performs a process of changing a photometric image K motion vector detection use flag to TRUE and ends the process. This is because an accumulation time is estimated to be a time within 4 ms in an accumulation Ank performed in the next time due to a high Ev value and a photometric image K captured in the accumulation time is used as a motion vector detection image.

On the other hand, in Step S810, the APU 112 performs a process of changing the photometric image K motion vector detection use flag to FALSE. This is because an accumulation time is estimated to be a time of 4 ms or more in an accumulation Ank performed in the next time due to a low Ev value and a photometric image K captured in the accumulation time is greatly affected by blur and thus cannot be used as a vector detection image.

In Step S811, the vector image K captured in Step S805 is stored and held in the memory 113. This is to hold the vector image K captured in this time as the previous vector image K to be used in the next Step S808.

Figure 11:
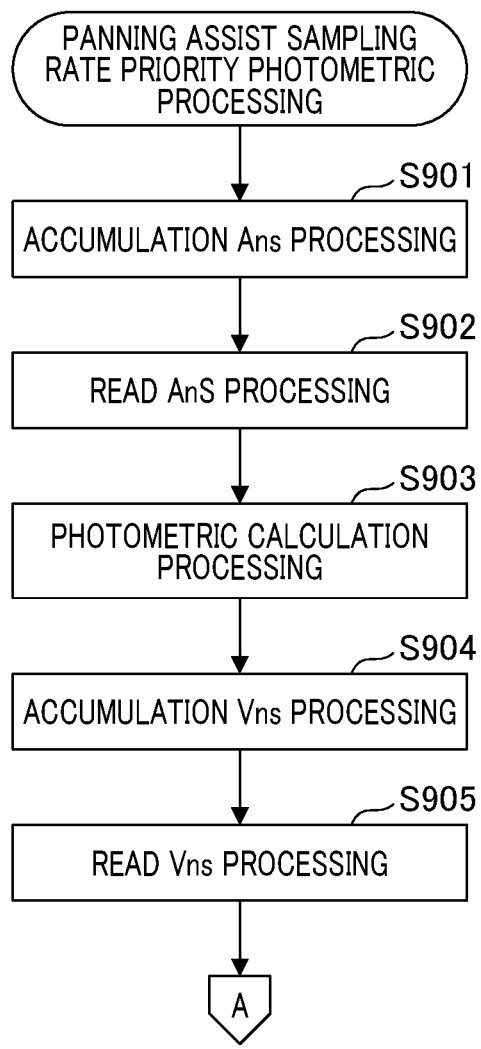
FIG. 11 is a flowchart for describing sampling rate priority photometry processing
Figure 12:
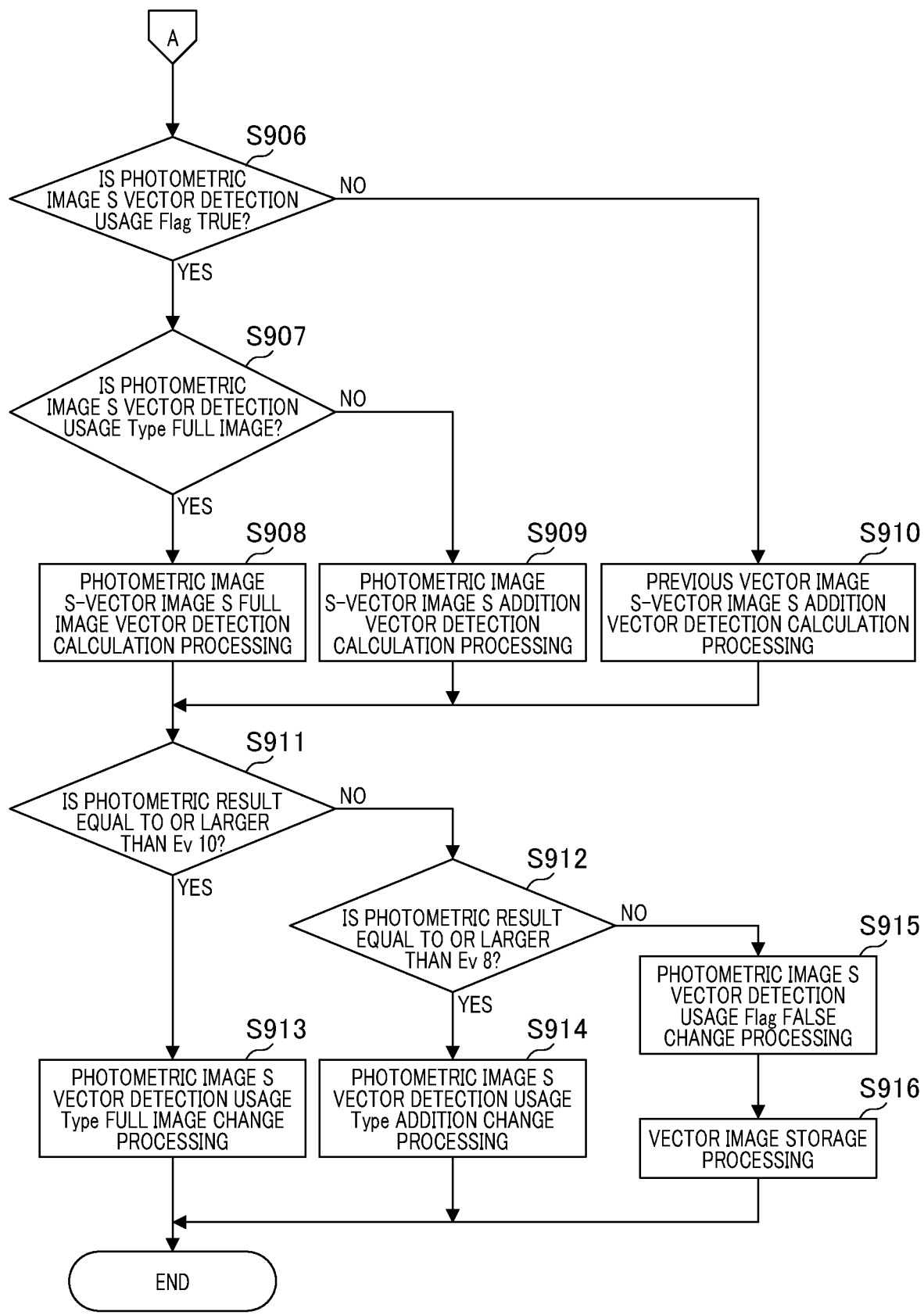
FIG. 12 is a flowchart for describing sampling rate priority photometry processing.

FIGS. 11 and 12 are flowcharts for describing the panning assist sampling rate priority photometry processing described with reference to Step S703 of FIG. 9. In these flowcharts, the processes described with reference to C of FIG. 3 are sequentially performed.

First, in Steps S901 and S902, a photometric image is captured and the brightness of the image is calculated in Step S903.

In Step S901, the accumulation Ans processing is performed. The accumulation Ans processing is performed on the photometric sensor 108 under the control of the APU 112. Note that the accumulation time at that time follows the program diagram described with reference to FIG. 6A. Furthermore, since a first accumulation time for the first time is not determined because there is no photometric value, it is assumed that the first accumulation time starts as 4 ms in which Ev 10 is assumed in the embodiment.

In Step S902, the read Ans processing is performed. In the read Ans processing, the APU 112 reads a signal corresponding to a charge accumulated in Step S901 from the photometric sensor 108 and acquires a photometric image S. The photometric image S is recorded in the memory 113. Note that, since the read Ans processing follows the program diagram described with reference to FIG. 6A, in the case of Ev 10 or more, reading is performed using the all pixel driving method, and in the case of less than Ev 10, reading is performed using the addition read driving method.

Subsequently, in Step S903, the APU 112 performs the photometric calculation processing on the basis of the photometric image S. Since an algorithm of the photometric calculation processing is not directly related to the feature of the present invention, description thereof will be omitted, but the photometric calculation processing is performed by the APU 112.

Subsequently, in Steps S904 and S905, an image for motion vector detection is captured.

In Step S904, the accumulation Vns processing is performed using the photometric sensor 108. The accumulation Vns processing is performed on the photometric sensor 108 under the control of the APU 112. Note that the accumulation time at that time follows the program diagram described with reference to FIG. 6B. Furthermore, since a first accumulation time for the first time is not determined because there is no photometric value, it is assumed that the first accumulation time starts as 4 ms in which Ev 10 is assumed in the embodiment.

In Step S905, the read Vns processing is performed. In the read Vns processing, the APU 112 reads a signal corresponding to a charge accumulated in Step S904 from the photometric sensor 108 and acquires a vector image S. The vector image S is recorded in the memory 113. Note that, since the vector image S follows the program diagram described with reference to FIG. 6B, in the case of Ev 10 or more, reading is performed using the all pixel driving method, and in the case of less than Ev 10, reading is performed using the addition read driving method.

Subsequently, in Steps S906 to S910, a motion vector is detected.

In Step S906, a flag used to determine whether the photometric image S acquired in Step S902 is used as an image for motion vector detection calculation is determined. This flag is stored in the memory 113 and determination is performed under the control of the APU 112. Note that, in the first time, it is assumed that TRUE is set as an initial value. When it is determined that the photometric image S is used, that is, when it is determined that the flag is TRUE, the process proceeds to a process of Step S907. On the other hand, when it is determined that the photometric image S is not used, that is, when it is determined that the flag is FALSE, the process proceeds to a process of Step S910.

In Step S907, the APU 112 determines whether a usage type of the photometric image S is a full image type or an addition type. This usage type is a read driving method and the first time is assumed to be a full image type as an initial value. In the second time and subsequent times, in Steps S913 and S914 which will be described below, the read driving method is determined. When it is determined in Step S907 that the usage type of the photometric image S is the full image type, the process proceeds to a process of Step S908. On the other hand, when it is determined that the usage type of the photometric image S is not the full image type, that is, when it is determined that the usage type of the photometric image S is the addition type, the process proceeds to a process of Step S909.

In Step S908, a motion vector is detected by performing the all pixel motion vector detection calculation processing using the block pattern matching for comparing images read using the all pixel driving method from the photometric image S and the vector image S.

In Step S909, a motion vector is detected by performing the addition motion vector detection calculation processing using the block pattern matching for comparing images read using the addition driving method from the photometric image S and the vector image S.

In Step S910, since the photometric image S is not used, a motion vector is detected by performing the addition motion vector detection calculation processing from a vector image S stored as the previous vector image and the vector image S acquired in Step S905. The addition motion vector detection calculation processing is performed using the block pattern matching for comparing images read using the addition driving method.

Subsequently, in Step S911, the APU 112 determines whether the result of the photometric calculation in Step S903 is equal to or larger than a predetermined first value. In such determination, it is determined whether a read driving method in the next time is the all pixel driving method or the addition read driving method. In addition, in the embodiment, it is determined whether an Ev value is Ev 10 or more. When it is determined that Ev is 10 or more, the process proceeds to a process of Step S913. On the other hand, when it is determined that Ev is not 10 or more, the process proceeds to a process of Step S912.

In Step S913, the APU 112 performs a process of changing the usage type of the photometric image S to a full image type. This is to determine that the accumulation time is a time within 4 ms and the all pixel read driving method is adopted because Ev is 10 or more in the accumulation Ans performed in the next time. Thus, in the next determination in Step S907, the usage type of the photometric image S is determined to be the full image type and a photometric image S captured in the accumulation time is used as a full image motion vector detection image. In addition, the APU 112 performs a process of changing the photometric image K motion vector detection use flag to TRUE and ends the process.

In Step S912, the APU 112 determines whether the result of the photometric calculation in Step S903 is equal to or larger than a predetermined second value. In the embodiment, it is determined whether the EV value is equal to or larger than Ev 8. When it is determined that Ev is equal to or larger than 8, the process proceeds to a process of Step S914. On the other hand, when it is determined that Ev is not equal to or larger than 8, that is, when it is determined that Ev is less than 8, the process proceeds to a process of Step S915.

In Step S914, the APU 112 performs a process of changing the usage type of the photometric image S to the addition type. This is to determine that the accumulation time is a time within 4 ms and the addition read driving method is adopted because Ev is 8 or more and less than 10 in the accumulation Ans performed in the next time. Thus, in the next determination in Step S907, the usage type of the photometric image S is determined to be the addition type and a photometric image S captured in the accumulation time is used as an addition motion vector detection image. In addition, the APU 112 performs a process of changing the photometric image K motion vector detection use flag to TRUE and ends the process.

In Step S915, the APU 112 performs a process of changing a photometric image S motion vector detection use flag to FALSE. This is because an accumulation time is estimated to be a time of 4 ms or more in the accumulation Ans performed in the next time due to a low Ev value and a photometric image S captured in the accumulation time is greatly affected by blur and thus cannot be used as a vector detection image.

In Step S916, the APU 112 stores and holds the vector image S acquired in Step S905 in the memory 113. This is held as the previous vector image S used in the next Step S910.

Also, in the embodiment, as illustrated in the program diagram or Steps S911 to S914 of FIGS. 5A to 6B, a reading method is determined in accordance with an Ev value serving as the result of photometry. As a result, determining an image used for detecting a motion vector in accordance with the reading method corresponds to determining an image used for detecting a motion vector in accordance with the result of photometry.

As illustrated in the program diagrams of FIGS. 5A to 6B, in the accumulation Vnk and the accumulation Vns for capturing an image for vector detection, the accumulation time of the accumulation Vns is set to be shorter than a predetermined time to minimize the occurrence of image blur in an image. On the other hand, the accumulation Ank and the accumulation Ans for capturing the photometric image are not provided with the limitation of the accumulation time for minimizing the image blur. For this reason, when the accumulation times of the accumulation Ank and the accumulation Ans are equal to or longer than a predetermined time, there is concern regarding the occurrence of image blur in the captured image. Since an image in which image blur occurs is not appropriate for detecting a motion vector, when an accumulation time in capturing a photometric image is equal to or longer than a predetermined time, the image is not used for vector detection. The vector detection in this case is performed on the basis of the previous and current vector images like in Step S808 or S910. In order to realize the above description, it may be determined before Step S806 or S906 whether the accumulation time in capturing the photometric image is equal to or longer than a predetermined time.

As described above, according to the embodiment, since the detection can be performed using motion vector detection methods corresponding to a plurality of panning assist setting modes, detection accuracy of a motion vector can be improved.

(Embodiment 2)

A system for performing panning assistance while performing photometry using a sensor of a penta part according to Embodiment 2 will be described. While the user sets the panning assist setting mode in Embodiment 1, a process performed when automatic selection in which the camera automatically selects the panning assist setting mode is set will be described in the embodiment. For example, automatic selection is effective when the user himself or herself cannot specify the condition in which the resolution is to be prioritized or the sampling rate is to be prioritized when the subject is small and fast or the like. In the automatic selection, the user may set an initial setting and a resolution priority may be set as an initial setting. Note that detailed description of constituent elements which are the same as those of Embodiment 1 will be omitted and differences therebetween will be mainly described.

Figure 13:
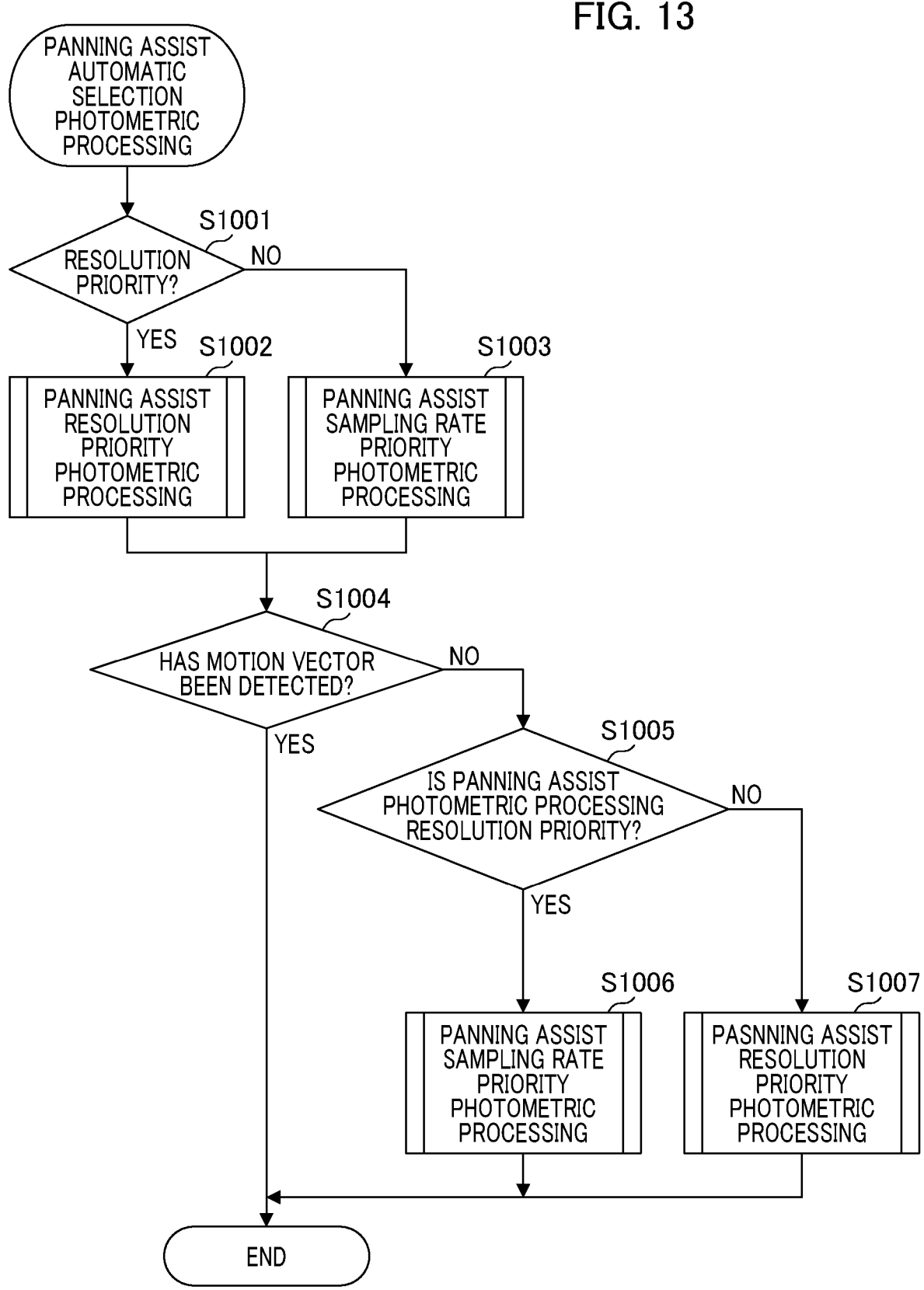
FIG. 13 is a flowchart for describing panning assist automatic selection photometry processing.

FIG. 13 is a flowchart for describing the panning assist automatic selection photometry processing in Step S608. First, Steps S1001 to S1003 performs the same processing as Steps S701 to S703 described with reference to Embodiment 1.

Subsequently, in Step S1004, the APU 112 determines whether a motion vector can be detected in Step S1002 or S1003. In Step S1004, when it is determined in Step S1004 that the motion vector detection has been performed, the process ends. On the other hand, when it is determined that the motion vector cannot be detected, the process proceeds to a process of Step S1005.

In Step S1005, the APU 112 determines whether the panning assist photometric processing in which the motion vector detection cannot be detected is resolution priority photometric processing. When it is determined that a resolution priority is prioritized, the process proceeds to a process of Step S1006. On the other hand, when it is determined that a resolution priority is not prioritized, the process proceeds to a process of Step S1007.

In Step S1006, the photometric processing in the panning assist sampling rate priority mode is performed and ends. In Step S1007, the photometric processing in the panning resolution priority mode is performed and ends. Thus, when the motion vector cannot be detected using one of the photometric methods, the camera can automatically select an effective photometric method by performing the motion vector detection using another method.

As described above, according to the embodiment, the panning assist setting mode can be automatically selected and detection accuracy of the motion vector can be improved.

(Embodiment 3)

A system for performing panning assistance while performing photometry using a sensor of a penta part according to Embodiment 3 will be described. In the embodiment, when a motion vector cannot be detected in a panning assist sampling rate priority mode, a process of changing a program diagram used in photometric processing in the panning assist sampling rate priority mode is performed. Note that detailed description of constituent elements which are the same as those of Embodiment 1 will be omitted and differences therebetween will be mainly described.

Figure 14:
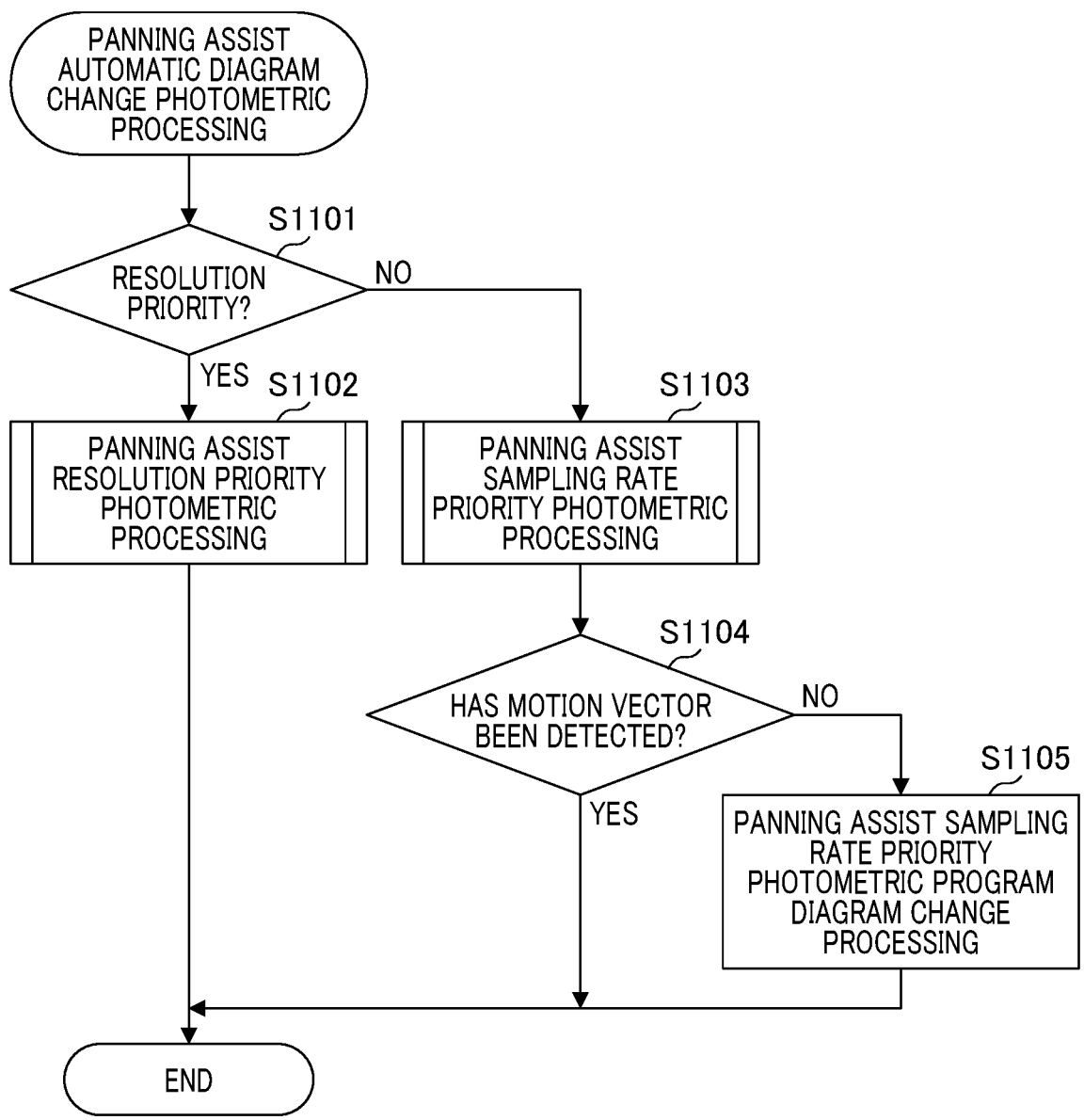
FIG. 14 is a flowchart for describing panning assist automatic diagram change photometry processing.

FIG. 14 is a flowchart for describing the panning assist automatic diagram change photometry processing. Such processing is performed in the panning assist photometric processing in Step S608.

First, Steps S1101 to S1103 performs the same processing as Steps S701 to S703 described with reference to Embodiment 1.

In Step S1104, the APU 112 determines whether a motion vector can be detected in the panning assist sampling rate priority photometry processing performed in Step S1103. When it is determined that the motion vector detection has been performed, the process ends. On the other hand, when it is determined that the motion vector detection cannot be performed, the process proceeds to a process of S1105.

In Step S1105, the APU 112 performs a process of changing the program diagram used in the photometric processing in the panning assist sampling rate priority mode and ends the process.

Figure 15A:
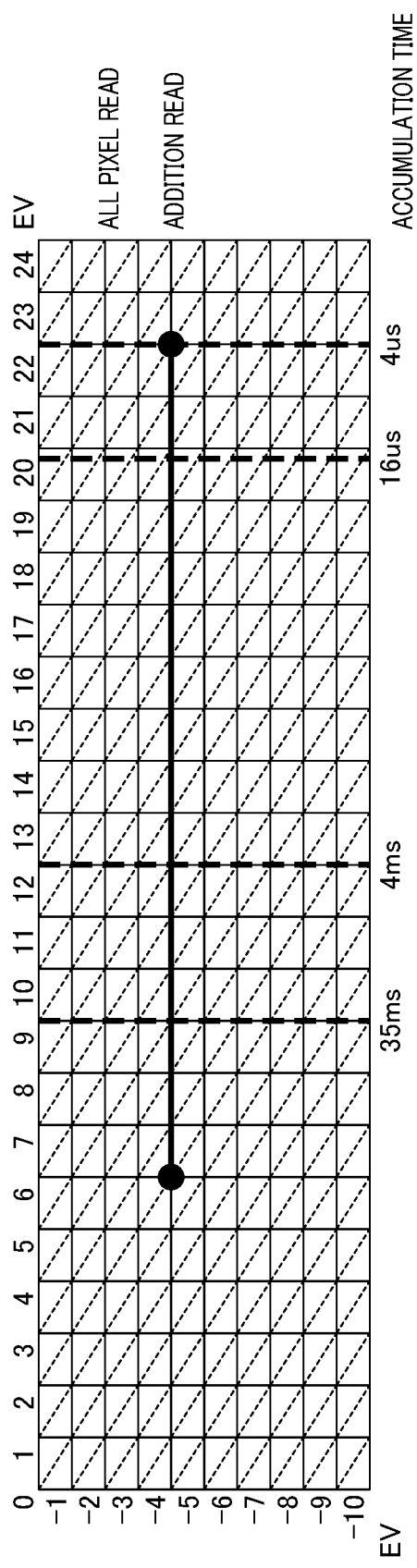
FIGS. 15A and 15B are diagrams illustrating an example of a changed program diagram.
Figure 15B:
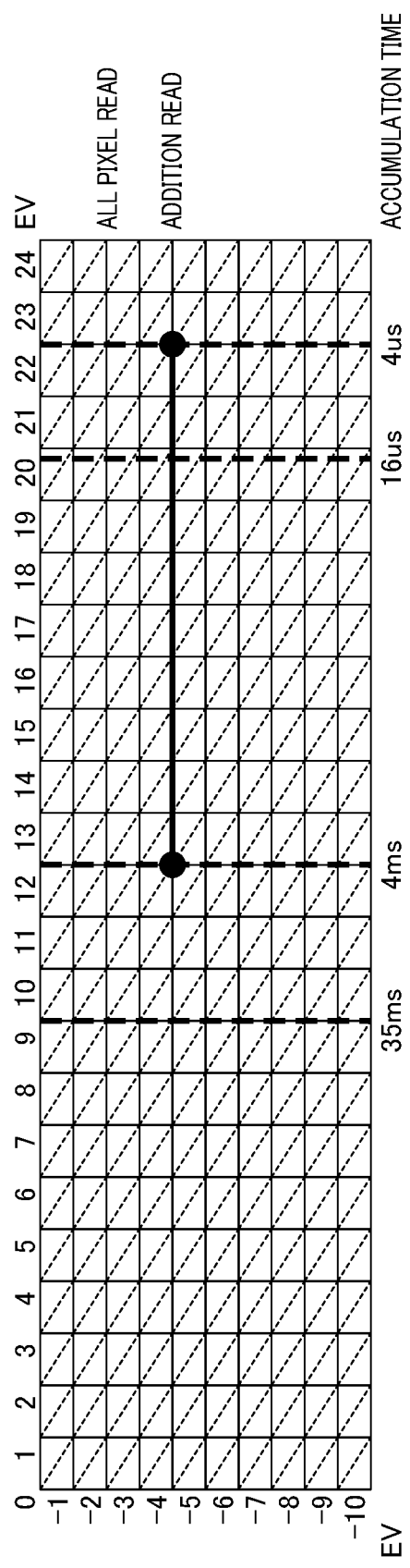

FIGS. 15A and 15B are diagrams illustrating examples of the changed program diagram.

FIG. 15A is the program diagram of an accumulation Ans and a read Ans in the photometric processing. Since the accumulation Ans and the read Ans are performed during the panning of the camera, capturing is performed using an addition read driving method at all times after the changing to cause burring of a subject in a photometric image S as well. Such a diagram is a diagram obtained by considering subject blur serving as a reason of deterioration in accuracy of motion vector detection and increases motion vector detection accuracy with an accumulation time as fast as possible at the same brightness.

FIG. 15B is the program diagram of the accumulation Vns and the read Vns in the motion vector detection processing. Similarly to the photometric image S, the addition read driving method is also always performed on the accumulation time of the accumulation Vns and the read driving method of the read Vns so that a sampling rate increases and vector detection is performed.

Note that, while the program diagram of the addition read driving method is used at all times in the modified diagram according to the embodiment, the present invention is not limited thereto and a method in which transitioning is performed to the program diagram of the addition read driving method step by step may be adopted. For example, when transitioning is performed to the program diagram for switching from Ev 14 to the addition read driving method as a diagram of a first stage but motion vector detection cannot be performed, a method in which transitioning is performed to the program diagram of the addition read driving method at all times may be adopted.

Also, the embodiment can also be applied to Embodiment 2. In this case, whether the angular velocity acquired from the angular velocity sensor 202 is larger than a predetermined value is determined after it is determined in Step S1005 that the panning assist sampling rate priority mode is selected. When it is determined that the angular velocity is larger than the predetermined value, like in the embodiment, the program diagram is changed so that the addition read driving method is selected at all times while the panning assist sampling rate priority mode is maintained. On the other hand, when the angular velocity is equal to or less than a predetermined value, like in Embodiment 2, the mode is changed to the panning assist resolution priority mode. This is because, when the angular velocity is larger than the predetermined value, it is estimated that a speed of a main body shaking at the time of panning is fast, that is, a moving speed of the subject is fast and it is necessary to raise a sampling rate in detecting a motion vector.

As described above, according to the embodiment, it is possible to make it possible to detect a motion vector and to improve accuracy of detection of a motor vector by changing the program diagram even when the motion vector cannot be detected.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-030878, filed Feb. 22, 2017, which is hereby incorporated by reference wherein in its entirety.

What is claimed is:

1. An image processing apparatus comprising:
   a memory; and
   at least one processor configured to execute units, in accordance with a program stored in the memory:
   an acquisition unit configured to acquire a first image captured through first imaging and a second image captured through second imaging performed subsequent to the first imaging,
   a first determination unit configured to determine an image used for calculating a motion vector from the first image and/or the second image in accordance with a result of photometry based on the first image,
   a calculation unit configured to calculate the motion vector on the basis of the determined image, and
   a second determination unit configured to determine whether a reading method of an image signal in capturing of the acquisition unit is performed using any of a first reading method and a second reading method having a shorter read time than the first reading method in accordance with a result of photometry based on the first image.

2. The image processing apparatus according to claim 1, wherein the first determination unit determines the first image and the second image as the image used for calculating the motion vector when the result of photometry is equal to or larger than that of a predetermined value.

3. The image processing apparatus according to claim 1, wherein the first determination unit determines the second image as the image used for calculating the motion vector when the result of photometry is that of less than the predetermined value.

4. The image processing apparatus according to claim 1, wherein the second determination unit determines the first reading method as the reading method of the image signal when the result of photometry is equal to or larger than that of the predetermined value and determines the second reading method as the reading method of the image signal when the result of photometry is less than that of the predetermined value.

5. The image processing apparatus according to claim 1, wherein the first reading method is an all pixel reading method and the second reading method is an addition reading method.

6. The image processing apparatus according to claim 1, further comprising:
   a setting unit configured to set whether to perform the first imaging and the second imaging in either of a resolution priority mode and a sampling rate priority mode.

7. The image processing apparatus according to claim 6, wherein the setting unit changes the setting to the resolution priority mode when the motion vector is unable to be detected in the sampling rate priority mode and changes the setting to the sampling rate priority mode when the motion vector is unable to be detected in the resolution priority mode.

8. The image processing apparatus according to claim 6, wherein the acquisition unit reads an image signal using the addition reading method when the motion vector is unable to be detected in the sampling rate priority mode.

9. An image processing apparatus comprising:
   a memory;
   at least one processor configured to execute, in accordance with a program stored in the memory:
   an acquisition unit configured to acquire a first image captured through first imaging and a second image captured through second imaging performed subsequent to the first imaging,
   a determination unit configured to determine an image used for calculating a motion vector from the first image and/or the second image, and
   a calculation unit configured to calculate the motion vector on the basis of the determined image, and
   the acquisition unit reads an image signal in any of a first reading method and a second reading method having a shorter read time than the first reading method in the first imaging or the second imaging, and
   the determination unit determines an image used for calculating the motion vector in accordance with the reading method.

10. The image processing apparatus according to claim 9, wherein the reading method is determined in accordance with a result of photometry based on the first image.

11. The image processing apparatus according to claim 9, wherein the determination unit determines the second image as an image used for calculating the motion vector when an accumulation time in the first imaging is equal to longer than a predetermined time.

12. An imaging apparatus comprising:
   a memory; and
   at least one processor configured to execute, in accordance with a program stored in the memory, an acquisition unit configured to acquire a first image captured through first imaging and a second image captured through second imaging performed subsequent to the first imaging, a first determination unit configured to determine an image used for calculating a motion vector from the first image and/or the second image in accordance with a result of photometry based on the first image, a calculation unit configured to calculate the motion vector on the basis of the determined image, and an imaging unit configured to capture the first image and the second image, and a second determination unit configured to determine whether a reading method of an image signal in capturing of the acquisition unit is performed using any of a first reading method and a second reading method having a shorter read time than the first reading method in accordance with a result of photometry based on the first image.

13. An imaging apparatus comprising:

a memory; and at least one processor configured to execute, in accordance with a program stored in the memory, an acquisition unit configured to acquire a first image captured through first imaging and a second image captured through second imaging performed subsequent to the first imaging, a determination unit configured to determine an image used for calculating a motion vector from the first image and/or the second image, a calculation unit configured to calculate the motion vector on the basis of the determined image, and an imaging unit configured to capture the first image and the second image wherein the acquisition unit reads an image signal in any of a first reading method and a second reading method having a shorter read time than the first reading method in the first imaging or the second imaging, and the determination unit determines an image used for calculating the motion vector in accordance with the reading method.

14. A method for controlling an image processing apparatus comprising:

acquiring a first image captured through first imaging and a second image captured through second imaging performed subsequent to the first imaging;

determining an image used for calculating a motion vector from the first image and/or the second image in accordance with a result of photometry based on the first image; and calculating the motion vector on the basis of the determined image, and determining whether a reading method of an image signal in capturing of the acquisition unit is performed using any of a first reading method and a second reading method having a shorter read time than the first reading method in accordance with a result of photometry based on the first image.

* * * * *